(12) United States Patent
Bates et al.

(10) Patent No.: US 6,993,749 B2
(45) Date of Patent: Jan. 31, 2006

(54) CONDITIONAL DEBUG MONITORS

(75) Inventors: Cary Lee Bates, Rochester, MN (US); Steven Gene Halverson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 10/108,685

(22) Filed: Mar. 28, 2002

(65) Prior Publication Data

US 2003/0188296 A1  Oct. 2, 2003

(51) Int. Cl.
G06F 9/44  (2006.01)
(52) U.S. Cl. ............... 717/124; 717/125; 717/127
(58) Field of Classification Search ........ 717/124–129, 717/142–144, 148, 150–153; 714/38
See application file for complete search history.

(56) References Cited

U.S. PATENT DOCUMENTS

| | | | | |
|---|---|---|---|---|
| 5,293,629 A | * | 3/1994 | Conley et al. ............... 717/154 |
| 5,404,496 A | * | 4/1995 | Burroughs et al. ............ 714/28 |
| 5,652,909 A | * | 7/1997 | Kodosky ..................... 717/125 |
| 5,740,440 A | * | 4/1998 | West ......................... 717/125 |
| 5,784,552 A | * | 7/1998 | Bishop et al. ................. 714/38 |
| 6,064,816 A | * | 5/2000 | Parthasarathy et al. ..... 717/109 |
| 6,189,116 B1 | * | 2/2001 | Mongan et al. ............... 714/38 |
| 6,385,769 B1 | * | 5/2002 | Lewallen .................... 717/125 |
| 6,438,713 B1 | * | 8/2002 | Taira et al. .................. 714/38 |
| 6,550,057 B1 | * | 4/2003 | Bowman-Amuah ......... 717/126 |
| 6,587,967 B1 | * | 7/2003 | Bates et al. .................. 714/35 |
| 6,631,518 B1 | * | 10/2003 | Bortnikov et al. .......... 717/158 |
| 6,634,019 B1 | * | 10/2003 | Rice et al. ................... 717/127 |
| 6,651,244 B1 | * | 11/2003 | Smith et al. ................. 717/154 |
| 6,745,383 B1 | * | 6/2004 | Agarwal et al. ............ 717/132 |
| 6,802,053 B1 | * | 10/2004 | Dye et al. .................... 717/113 |
| 6,817,010 B2 | * | 11/2004 | Aizenbud-Reshef et al. ..... 717/127 |

OTHER PUBLICATIONS

Bitterer et al., "AS/400 Programming with VisualAge for RPG", IBM corporation, International Technical Support Organization, First Edition, Chapter 1-3, pp 3-94; Exercise 1-3, pp 229-311, May 1998.*

The IBM eServer iSeries 400 AD Strategy Team, "OS/400 Application Development Directions", IBM corp, Oct. 2000.(52 pages).*

Xie et al, "Scalable error detection using boolean satisfiablity", ACM POPL, pp 351-363,2005.*

Rountev et al, "Static and dyanmic analysis of call chains in Java", ACM ISSTA, pp 1-11, 2004.*

Visser et al, "test input generation with java path finder", ACM ISSTA, pp 97-107, 2004.*

Liao et al, "A test compression based method for code size minimization in embabed systems", ACM Trans on design automation of Electronic Sys. vol. 4, No. 1, pp 12-38, 1999.*

* cited by examiner

*Primary Examiner*—Anil Khatri
(74) *Attorney, Agent, or Firm*—Patterson & Sheridan, LLP

(57) ABSTRACT

A method, apparatus and article of manufacture for associating a condition with a monitored expression are provided. Information regarding the monitored expression is only fully rendered a monitor window when a condition is satisfied. In another embodiment, a viewable representation of the expression is modified when a condition is satisfied.

27 Claims, 6 Drawing Sheets

```
iSeries System Debugger                                    _ □ ×
File  Edit  Debug  Breakpoint  Actions  Window  Help
⇪ ☆ ◎                       ▣□                                        ⊠ ⊡ ×
/Qsys.lib/Carytest.lib/S.pgm/S                              □Group1  ▶

24
25      2       struct passwd *pw    = getpwuid(getuid());
26
27      3       char   *name = (char *)malloc(20);
28              char    test[20];
29              STUFF   stuff;
30              STUFF   *ptr, *ptr1, *ptr2;
31      4       ++x;
32      5       strcpy (name, "shalver");
33      6       strcpy (test, "halverson");
34
35  ⇨  7       memset (&stuff, 0, sizeof(stuff));
36      8       stuff.x = 1;
37      9       stuff.y = 2;
38      10      stuff.z = 1;
39      11      stuff.a = 2;
40      12      stuff.str = (char *)malloc( 20 );
41      13      stuff.moreStuff = (MORESTUFF *)malloc( sizeof( MORESTUFF ) );
42      14      stuff.moreStuff->x = 100;
43      15      stuff.moreStuff->y = 200;
```

□ Locals □ Monitors ▣ Console

| Name | Value | Watch |
|---|---|---|
| (stuff.z == 1) | | |
| ⊟⊹= stuff | | □ |
| ⋯ 🗔= x | 1 | □ |
| ⋯ 🗔= y | 2 | □ |
| ⋯ 🗔= z | 1 | □ |
| ⋯ 🗔= a | 0 | □ |
| ⋯ ⊟▸ str | SPP*NULL | □ |
| ⋯ ⊟▸ moreStuff | SPP*NULL | □ |

Step completed at line: 39

CONDITIONAL DEBUG MONITORS

BACKGROUND OF THE INVENTION

1. Field of the Invention

The present invention generally relates to data processing and more particularly to program monitors.

2. Description of the Related Art

A programmer develops a software program by producing and entering source code into files using a text editor program on a computer. The computer then creates an executable program by translating the source code into machine code. The machine code is the rudimentary instructions understood by a computer. Illustratively, the foregoing software development process is accomplished by running a series of programs. These programs typically include a compiler for translating the source code into machine code and a linker to link the machine code together to form a program.

When developing computer software, it is necessary to perform a function termed "debugging". Debugging involves testing and evaluating the software to find and correct any errors and improper logic operation. An effective debugger program is necessary for rapid and efficient development of software.

A conventional debugging system comprises a combination of computer hardware and debugger software that executes a user's program in a controlled manner. Debugging aids a user in identifying and correcting mistakes in an authored program by allowing the program to be executed in small segments. To this end, debugging provides functions including breakpoints, run-to-cursor, step into, step over and the like.

One feature typically included with debugging programs is a program monitor. A program monitor allows a user to monitor specified variables. Once a program monitor is activated for a specified variable, the variable value is displayed in a monitor window of the debugging user interface. One problem with program monitors, however, is that users typically require too many program monitors for the available space in the monitor window. Even when a user resizes the monitor window to accommodate all of the active program monitors, it is often difficult to locate the particular monitored variable of interest.

Therefore, there is a need for a method, apparatus and article of manufacture for improved program monitors.

SUMMARY OF THE INVENTION

The present invention generally provides a method, apparatus and article of manufacture for associating a condition with a monitored expression.

One embodiment provides a method of monitoring an expression in code during a debugging session. The method comprises executing the code, determining whether a condition established for the expression is satisfied, and displaying a viewable representation of the expression only if the condition is satisfied.

Another embodiment provides a method of monitoring an expression in code, comprising establishing a condition for the expression, executing the code, and determining whether the condition is satisfied. If the condition is satisfied, one of the following is performed: (i) displaying a viewable representation of the expression; and (ii) modifying the viewable representation of the expression to differentiate the viewable representation from other viewable representations of other expressions having associated unsatisfied conditions.

Yet another embodiment includes a computer readable medium containing a program which, when executed, performs the foregoing methods.

Still another embodiment includes a computer which performs the foregoing methods.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 is a graphical user interface showing a dialog box for setting a monitored expression and associated condition.

FIG. 4 is a graphical user interface before a condition of an associated monitored expression is true.

FIG. 5 is a graphical user interface after a condition of an associated monitored expression is true.

FIG. 6 is a graphical user interface illustrating an alternative embodiment in which a collapsed tree structure is shown before a condition of an associated monitored expression is true.

DETAILED DESCRIPTION OF THE PREFERRED EMBODIMENTS

The present invention generally provides a method, apparatus and article of manufacture for associating a condition with a monitored expression Information regarding the monitored expression Is only fully rendered in a monitor window when a condition is satisfied. As defined herein, a monitored expression includes a variable or two or more variables connected by an operator(s). In general, the condition defined for a monitored expression may be directly related to the monitored expression itself and/or related to some other value or expression.

One embodiment of the invention is implemented as a program product for use with a computer system such as, for example, the computing environment shown in FIG. 1 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated into a machine-readable format and, hence, executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and, thus, the invention should not be limited to use solely in any specific application identified and/or implied by such nomenclature.

Figure 1:
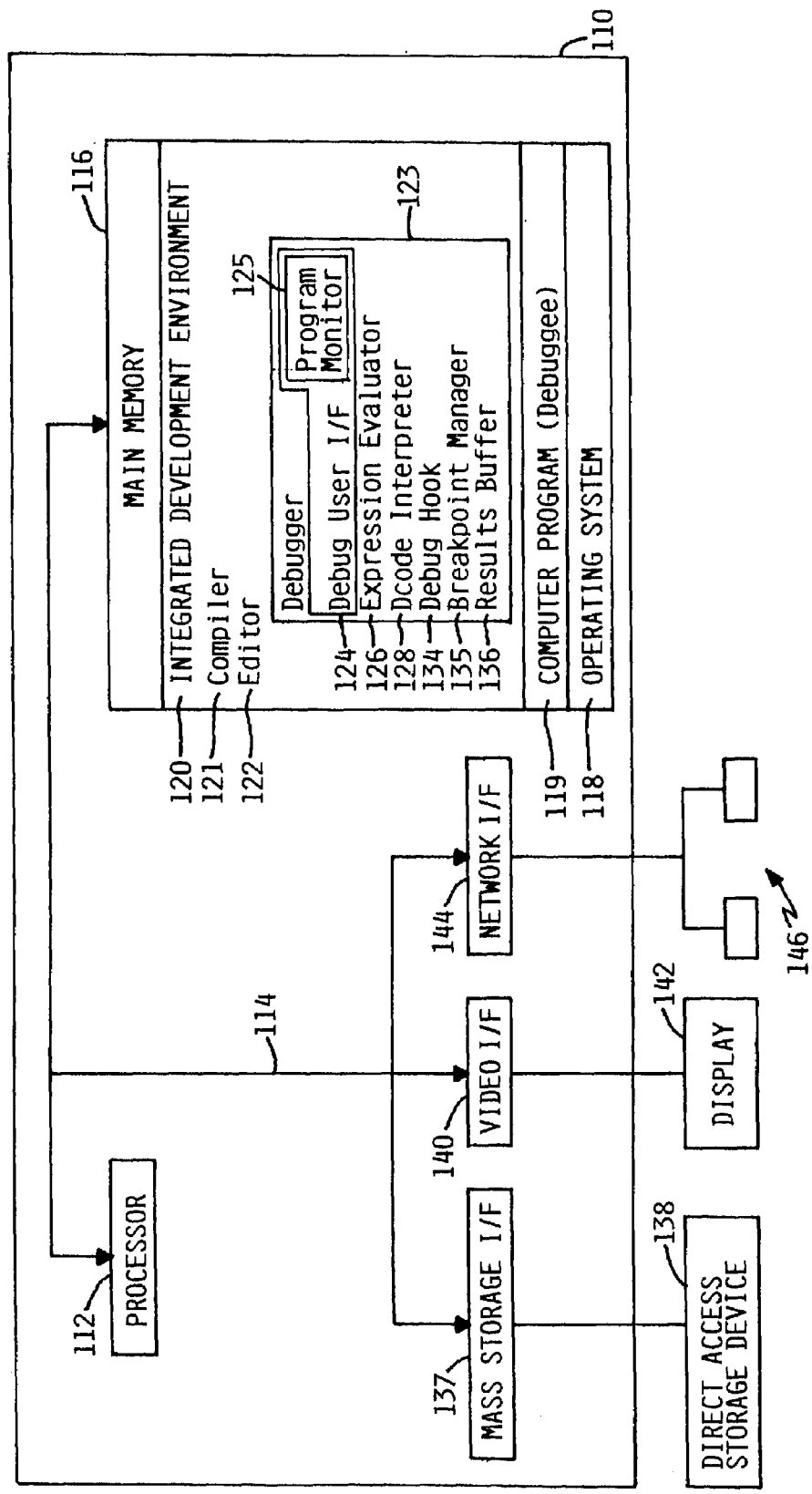
FIG. 1 is a high level diagram of a computer system.

Referring now to FIG. 1, a computing environment 100 is shown. In general, the distributed environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions, or operation codes, (also known as opcodes), and data via a bus 114 from a main memory 116. The processor 112 could be any processor adapted to support the debugging methods of the invention. In particular, the computer processor 112 is selected to support the debugging features of the present invention. Illustratively, the processor is a PowerPC processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer system 110 via bus 114.

As shown, the main memory 116 generally includes an operating system 118, a computer program 119, a compiler 120 and debugger program (the debugger) 123. The operating system 118 may be any suitable operating system such as OS/400®. The computer program 119 represents any code that is to be examined, edited, compiled and/or debugged. In one embodiment, the debugger 123 is a VisualAge® debugger for the OS/400®, modified according to the invention. OS/400® and VisualAge® are available from International Business Machines, Corporation of Armonk, N.Y.

Although the software constructs, such as the computer program 119 and the debugger 123, are shown residing on the same computer, a distributed environment is also contemplated. Thus, for example, the debugger 123 may be located on a networked device 146, while the computer program 119 to be debugged is on the computer system 110.

In a specific embodiment, the debugger 123 comprises a debugger user interface 124, expression evaluator 126, Dcode interpreter 128 (also referred to herein as the debug interpreter 128), debugger hook (also known as a stop handler) 134, a breakpoint manager 135 and a results buffer 136. Although treated herein as integral parts of the debugger 123, one or more of the foregoing components may exist separately in the computer system 110. Further, the debugger may include additional components not shown.

A debugging process is initiated by the debug user interface 124. The user interface 124 presents the program under debugging and highlights the current line of the program on which a stop or error occurs. The user interface 124 allows the user to set control points (e.g., breakpoints and watch points), display and change variable values, and activate other inventive features described herein by inputting the appropriate commands. In some instances, the user may define the commands by referring to high-order language (HOL) references such as line or statement numbers or software object references such as a program or module name, from which the physical memory address may be cross-referenced. In the embodiments of the invention, the debug user interface 124 includes program monitor code 125 which is invoked to allow a user to set program monitors for various expressions. In one embodiment, a program monitor may have an associated condition.

The expression evaluator 126 parses the debugger command passed from the user interface 124 and uses a data structure (e.g., a table) generated by the compiler 124 to map the line number in the debugger command to the physical memory address in memory 116. In one embodiment, the program monitor code 125 uses the expression evaluator 126 to evaluate expressions and evaluate an associated condition, as will be described in more detail below. In addition, the expression evaluator 126 generates a Dcode program for the command. The Dcode program is machine executable language that emulates the commands. Some embodiments of the invention include Dcodes which, when executed, activate control features described in more detail below.

The Dcode generated by the expression evaluator 126 is executed by the Dcode interpreter 128. The interpreter 128 handles expressions and Dcode instructions to perform various debugging steps. Results from Dcode interpreter 128 are returned to the user interface 124 through the expression evaluator 126. In addition, the Dcode interpreter 128 passes on information to the debug hook 134, which takes steps described below.

After the commands are entered, the user provides an input that resumes execution of the program 120. During execution, control is returned to the debugger 123 via the debug hook 134. The debug hook 134 is a code segment that returns control to the appropriate user interface. In some implementations, execution of the program eventually results in an event causing a trap to fire. For example, a trap is fired when a breakpoint or watchpoint is encountered. Inserting and managing special op codes that cause these traps to fire is the responsibility of the breakpoint manager 135. When a trap fires, control is then returned to the debugger by the debug hook 134 and program execution is halted. The debug hook 134 then invokes the debug user interface 124 and may pass the results to the user interlace 124. Alternatively, the results may be passed to the results buffer 136 to cache data for the user interface 124. In other embodiments, the user may input a command while the program is stopped, causing the debugger to run a desired debugging routine. Result values are then provided to the user via the user interface 124.

Figure 2:
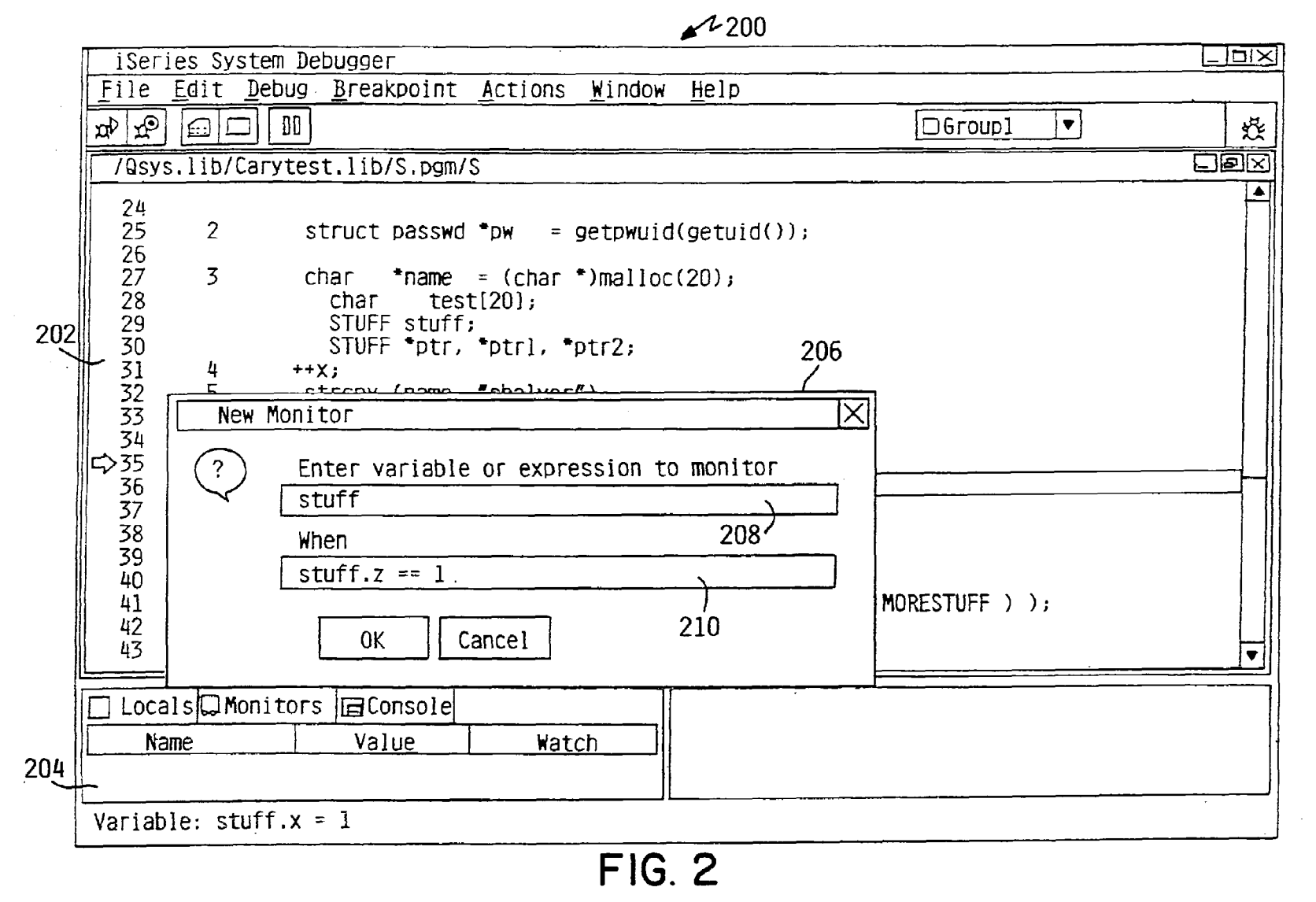

In one embodiment of the present invention, a user is able to specify an expression and a condition for the expression via a graphical user interface. FIG. 2 is one embodiment of a graphical user interface (GUI) 200, which may be representative of the debug user interface 124. In general, the GUI 200 includes a source code window 202 containing the source code of the computer program 119 being debugged and a monitor window 204. The monitor window 204 selectively displays information pertaining to expressions being monitored. Specifically, the information displayed in the monitor window 204 for each monitored expression may be dependent upon a condition or conditions associated with each of the respective monitor expressions.

In one embodiment, a monitored expression and its respective condition are specified by a user via a dialog box 206, provided by the program monitor code 125 of the user interface 124. In the illustrative dialog box 206 shown in FIG. 2, the dialog box 206 includes an expression field 208 (in which a user inputs an expression of interest) and a condition field 210 (in which a user inputs a condition for the specified expression of interest). By way of illustration, the user-specified expression to be monitored is "stuff" and the user-specified condition is "stuff.z==1". After setting one or more conditional monitors, execution of the computer program 119 may be resumed. For example, the user may step through the source code of the computer program 119, run to a cursor position or allow the program to run to the next event that causes the debugger to gain control, such as hitting a breakpoint.

Figure 3:
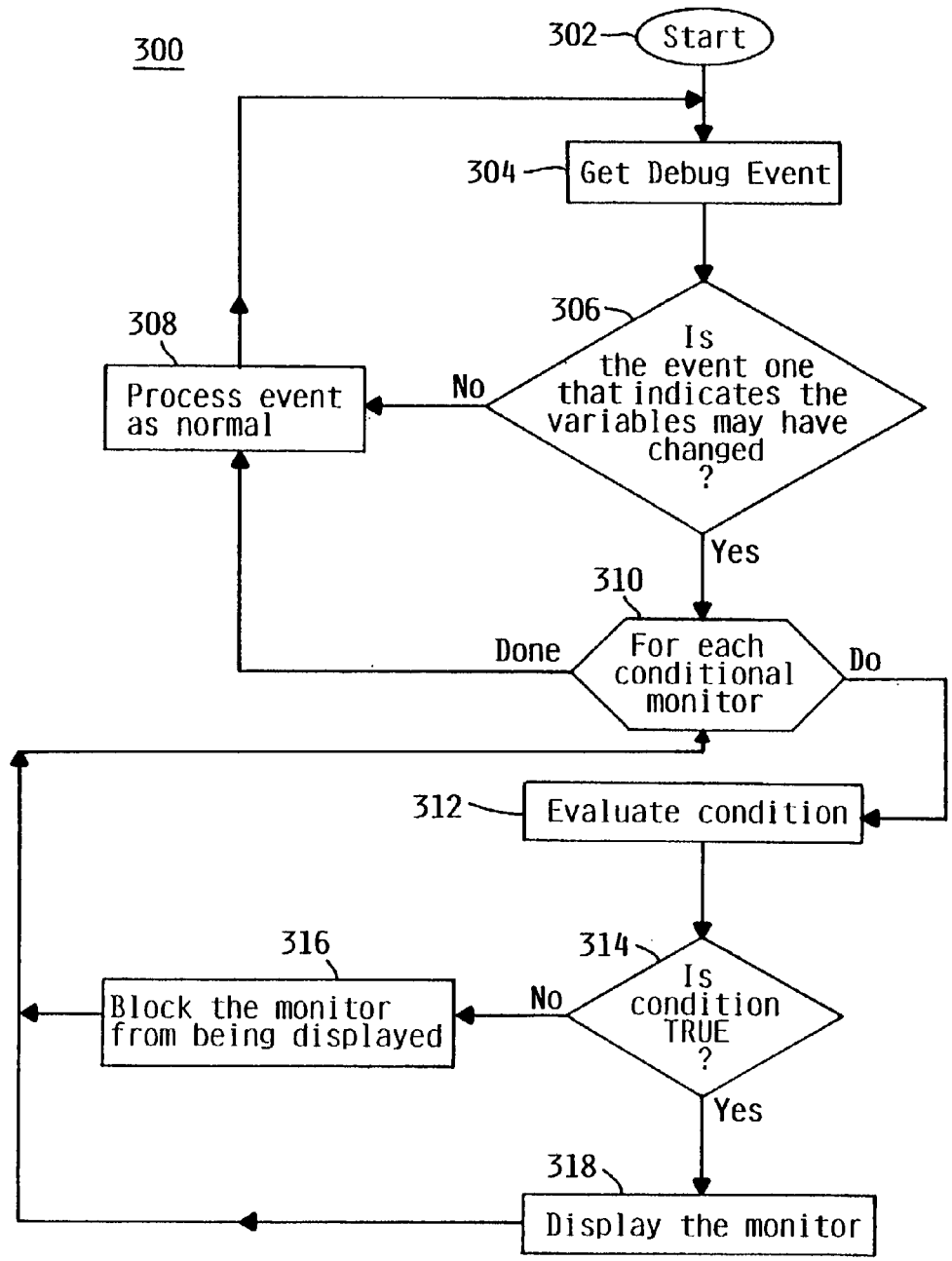
FIG. 3 is a flow chart illustrating the operation of a conditional debug monitor.

One embodiment of the subsequent operation of the program monitor code 125 with respect to conditional monitors is described with respect to FIG. 3. The method of operation 300 of the conditional monitor is entered at step 302 and then proceeds to step 304 to get a debug event. At step 306, the method 300 queries whether the event is one which indicates that the expressions being monitored may have changed. If not, the event is processed as normal at step 308, after which processing returns to step 304.

Alternatively, if step 306 is answered affirmatively, the method 300 enters a loop at step 310 for each conditional monitor. At step 312, the associated condition for a given monitored expression is evaluated. At step 314, the method 300 queries whether the condition is true. If the condition is not true, the monitored expression is not displayed in the monitor window 204. If, however, the condition is true, the monitored expression is displayed in the monitor window 204 at step 318. In either case, processing then returns to step 310 for the next conditional monitor. Once each of the conditional monitors have been processed, the method 300 proceeds to step 308 and then returns to step 304.

Figure 4:
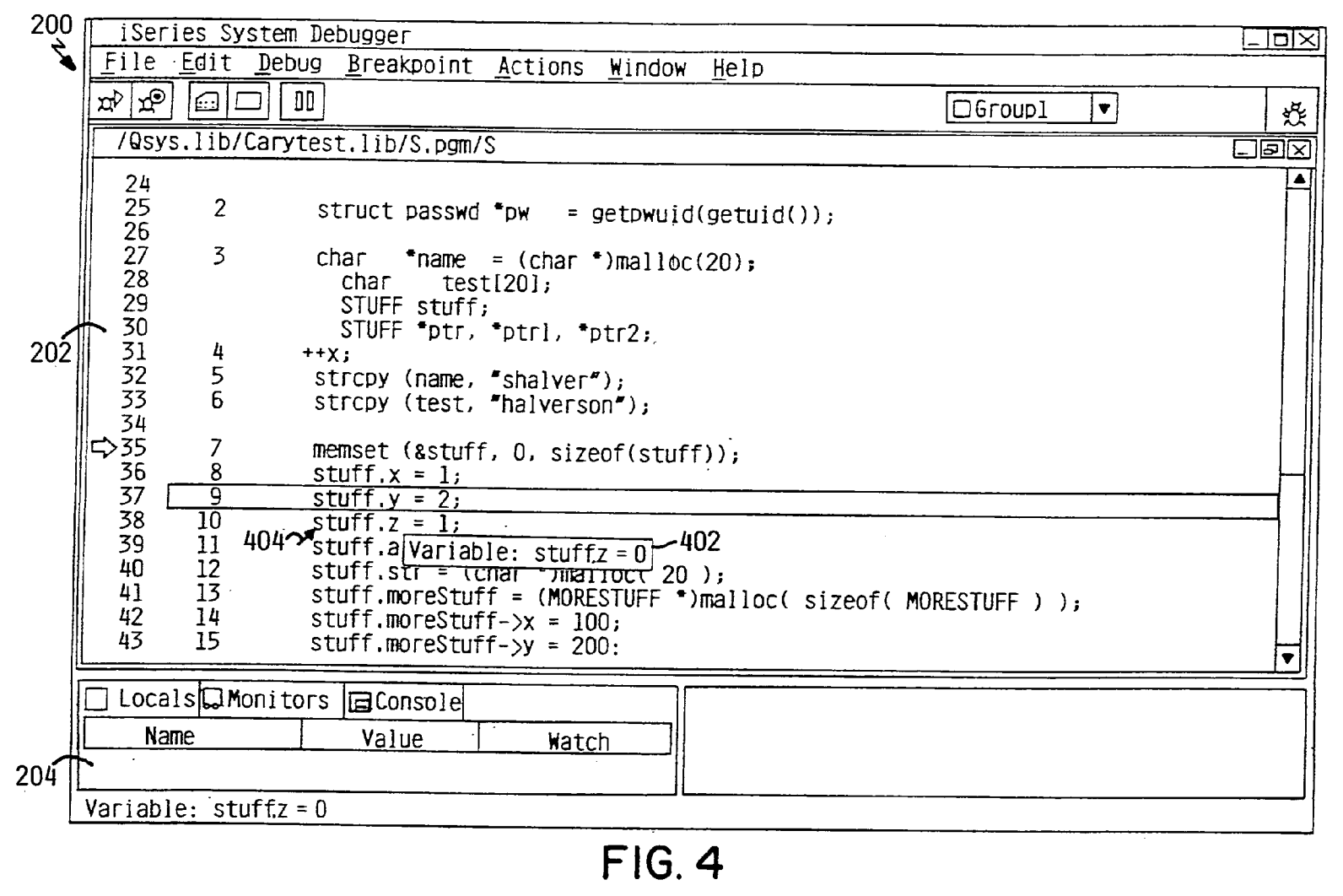

A particular example of the foregoing method of operation may be described with reference to FIG. 4 and FIG. 5, both of which are representations of the GUI 200 described with reference to FIG. 2. As such, it is assumed that a conditional monitor has been set for "stuff" (i.e., "stuff.z==1"), as described above. Referring first FIG. 4, execution of the computer program 119 is shown halted on line 37. A flyover text box 402 associated with the cursor 404 indicates the current value of the variable "stuff.z". Specifically, the current value of the variable "stuff.z" is zero (0). Accordingly, because the specified condition for the monitored expression "stuff" is not true, the monitored expression is not rendered in the monitor window 204. The user may then perform any number of debugging actions or allow the program 119 to resume execution.

Figure 6:
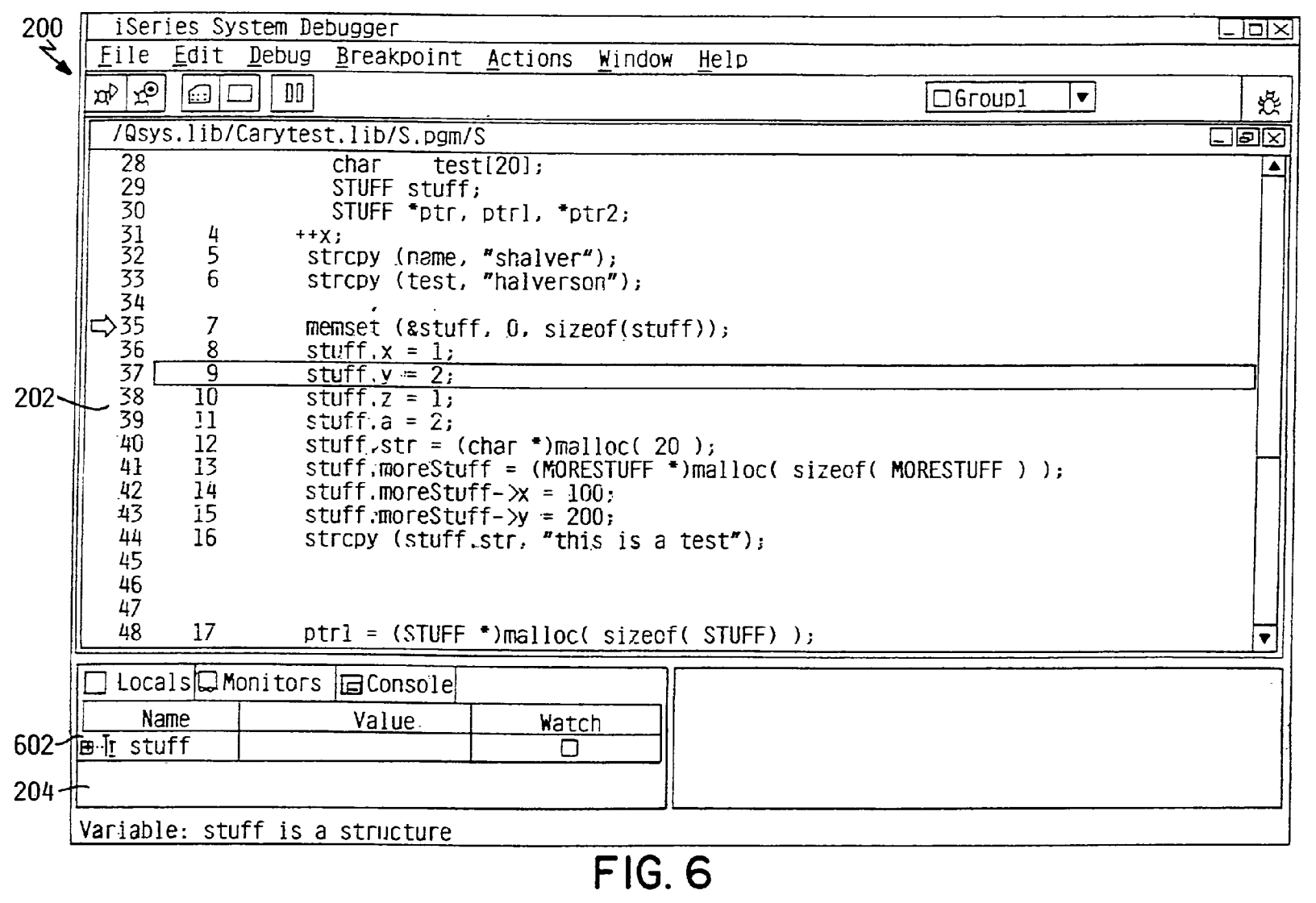

Referring now to FIG. 5, the execution of the computer program 119 is shown halted on line 39. Because the statement on line 38 has been executed, the condition (i.e., "stuff.z==1") for the monitored expression "stuff" has been satisfied. Accordingly, the monitored expression is rendered in the monitor window 204. Illustratively, each of the values for "stuff" is displayed in the form of a tree structure. In an alternative embodiment, rather than displaying no representation for a monitored expression when the associated condition is not satisfied, a collapsed tree structure for the monitored expression may be displayed. An example of such an embodiment is shown in FIG. 6, in which a collapsed tree structure 602 for "stuff" is displayed. Once the associated condition for the monitored expression is satisfied, the tree structure 602 is displayed in its expanded form, as shown in FIG. 5.

In general, the condition defined for a monitored expression may be directly related to the monitored expression itself, as in the example described above with reference to FIGS. 2–4. However, in other embodiments, the condition for a monitored expression may be related to some other value or expression. For example, the condition for "stuff" may be "i>100", or any other valid Boolean expression.

In each of the foregoing examples, a condition is evaluated to determine whether an associated monitored expression should be displayed. However, in another embodiment, the monitored expression is always displayed and the associated condition is evaluated to determine whether the viewable representation of the monitored expression should be highlighted. In this regard, "highlighting" includes any manner of representing the monitored expression more prominently with respect to other monitored expressions whose associated conditions are not true. For example, highlighting may include displaying the monitored expression in a particular color or font, underlining and/or italicizing the monitored expression, etc.

While the foregoing is directed to embodiments of the present invention, other and further embodiments of the invention may be devised without departing from the basic scope thereof, and the scope thereof is determined by the claims that follow.

What is claimed is:

1. A method of monitoring an expression defined in a text-based source code of a computer program, comprising:
   establishing a Boolean condition for the expression, wherein the expression includes at least one variable connected by an operator;
   executing object code corresponding to the source code;
   determining whether the expression satisfies the Boolean condition as a result of the execution of the object code;
   if the Boolean condition is satisfied, performing one of:
     displaying a viewable representation of the expression; and
     modifying the viewable representation of the expression to differentiate the viewable representation from other viewable representations of other expressions having associated unsatisfied conditions.

2. The method of claim 1, wherein determining whether the condition is satisfied is performed by a debugging program.

3. The method of claim 1, wherein displaying the viewable representation of the expression if the condition is satisfied, comprises displaying the viewable representation of the expression in a monitor window of a graphical user interface.

4. The method of claim 1, wherein the viewable representation of the expression is a collapsed tree structure and wherein modifying the viewable representation of the expression if the condition is satisfied, comprises expanding the collapsed tree structure.

5. The method of claim 1, wherein modifying the viewable representation of the expression if the condition is satisfied, comprises highlighting the viewable representation of the expression.

6. The method of claim 5, wherein highlighting the viewable representation of the expression comprises at least one of highlighting the viewable representation of the expression with a color; underlining the viewable representation of expression, changing a font of the viewable representation of the expression and italicizing the viewable representation of the expression.

7. A method of monitoring an expression comprising at least one variable connected by an operator that appears in a text-based source code of a computer program during a debugging session, comprising:
   executing a compiled version of the text-based source code;
   determining whether the expression satisfies a Boolean condition established for the expression as a result of the execution of the object code; and
   displaying a viewable representation of the expression only if the condition is satisfied.

8. The method of claim 7, wherein executing the code comprises stepping through the code.

9. The method of claim 7, wherein determining and displaying are performed for a plurality of expressions each having an associated Boolean condition.

10. The method of claim 7, wherein determining comprises evaluating the Boolean condition, to determine a true or false value for the Boolean condition.

11. The method of claim 7, wherein determining whether the Boolean condition is satisfied is performed by a debugging program.

12. The method of claim 7, wherein displaying the viewable representation of the expression if the Boolean condition is satisfied, comprises displaying the viewable representation of the expression in a monitor window of a graphical user interface.

13. The method of claim 7, wherein executing the code comprises stepping through the code.

14. A computer readable medium containing a program which, when executed, performs an operation of monitoring an expression appearing in a text-based source code of a computer program, comprising at least one variable connected by an operator the operation comprising:
   establishing a Boolean condition for the expression, wherein the expression includes at least one variable connected by an operator;
   executing object code corresponding to the source code;
   determining whether the expression satisfies the Boolean condition as a result of the execution of the object code;
   if the Boolean condition is satisfied, performing one of:
     displaying a viewable representation of the expression; and
     modifying the viewable representation of the expression to differentiate the viewable representation from other viewable representations of other expressions having associated unsatisfied Boolean conditions.

15. The computer readable medium of claim 14, wherein the program is part of a debugging program.

16. The computer readable medium of claim 14, wherein displaying the viewable representation of the expression if the condition is satisfied, comprises displaying the viewable representation of the expression in a monitor window of a graphical user interface.

17. The computer readable medium of claim 14, wherein the viewable representation of the expression is a collapsed tree structure and wherein modifying the viewable representation of the expression if the condition is satisfied, comprises expanding the collapsed tree structure.

18. The computer readable medium of claim 14, wherein modifying the viewable representation of the expression if the condition is satisfied, comprises highlighting the viewable representation of the expression.

19. The computer readable medium of claim 18, wherein highlighting the viewable representation of the expression comprises at least one of highlighting the viewable representation of the expression with a color; underlining the viewable representation of expression, changing a font of the viewable representation of the expression and italicizing the viewable representation of the expression.

20. A computer readable medium containing a program which, when executed, performs an operation of monitoring an expression comprising at least one variable connected by an operator that appears in a text-based source code of a computer program during a debugging session, the operation comprising:
   executing a compiled version of the text-based source code;
   determining whether the expression satisfies a Boolean condition established for the expression as a result of the execution of the object code; and
   displaying a viewable representation of the expression only if the condition is satisfied.

21. The computer readable medium of claim 20, wherein determining and displaying are performed for a plurality of expressions each having an associated condition.

22. The computer readable medium of claim 20, wherein determining comprises evaluating the Boolean condition, to determine a true or false value for the Boolean condition.

23. The computer readable medium of claim 20, wherein determining whether the condition is satisfied is performed by a debugging program.

24. The computer readable medium of claim 20, wherein displaying the viewable representation of the expression if the condition is satisfied, comprises displaying the viewable representation of the expression in a monitor window of a graphical user interface.

25. A computer system, comprising:
- a memory containing at least a conditional debug monitor and source code under debug;
- a processor which, when executing the conditional debug monitor performs an operation of monitoring an expression in the source code during a debugging session, wherein the expression includes at least one variable connected by an operator, the operation comprising:
    - determining whether a Boolean condition established for the expression is satisfied as a result of the execution of the object code; and
    - displaying a viewable representation of the expression only if the Boolean condition is satisfied.

26. The computer system of claim 25, wherein the memory further contains a graphical user interface and wherein displaying the viewable representation of the expression if the condition is satisfied comprises displaying the viewable representation of the expression in a monitor window of the graphical user interface.

27. The computer system of claim 25, wherein the conditional debug monitor is part of a debug program and wherein the processor returns control to the debug program from the code under debug when a debug event is encountered.

* * * * *